(12) United States Patent
Satake et al.

(10) Patent No.: US 6,967,801 B2
(45) Date of Patent: Nov. 22, 2005

(54) ADJUSTING CLOCK FREQUENCY IN A DISK DRIVE AND A DISK SYSTEM USING THE SAME

(75) Inventors: Kazuhiko Satake, Odawara (JP); Katsuhiro Tsuneta, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 204 days.

(21) Appl. No.: 10/382,002

(22) Filed: Mar. 4, 2003

(65) Prior Publication Data
US 2004/0008442 A1    Jan. 15, 2004

(30) Foreign Application Priority Data
Jul. 15, 2002    (JP) .............................. 2002-205003

(51) Int. Cl.[7] ........................................... G11B 15/18
(52) U.S. Cl. ....................................................... 360/69
(58) Field of Search ........................................... 360/69

(56) References Cited

U.S. PATENT DOCUMENTS 5,805,386 A * 9/1998 Faris ........................ 360/264.4
6,675,244 B1 * 1/2004 Elliott et al. ................. 710/107

FOREIGN PATENT DOCUMENTS

JP    6-131073    5/1994

* cited by examiner

*Primary Examiner*—David Hudspeth
*Assistant Examiner*—Mitchell Slavitt
(74) *Attorney, Agent, or Firm*—Townsend and Townsend and Crew LLP

(57) ABSTRACT

The electromagnetic noise radiated from a magnetic disk system comprising two or more magnetic disk drives is reduced so as not to exceed a certain level although the electromagnetic noise from each magnetic disk drive is added up. This is achieved by setting a different operation clock frequency for each SCSI-ID so that the electromagnetic noise radiated from each magnetic disk drive has a different frequency band.

20 Claims, 4 Drawing Sheets

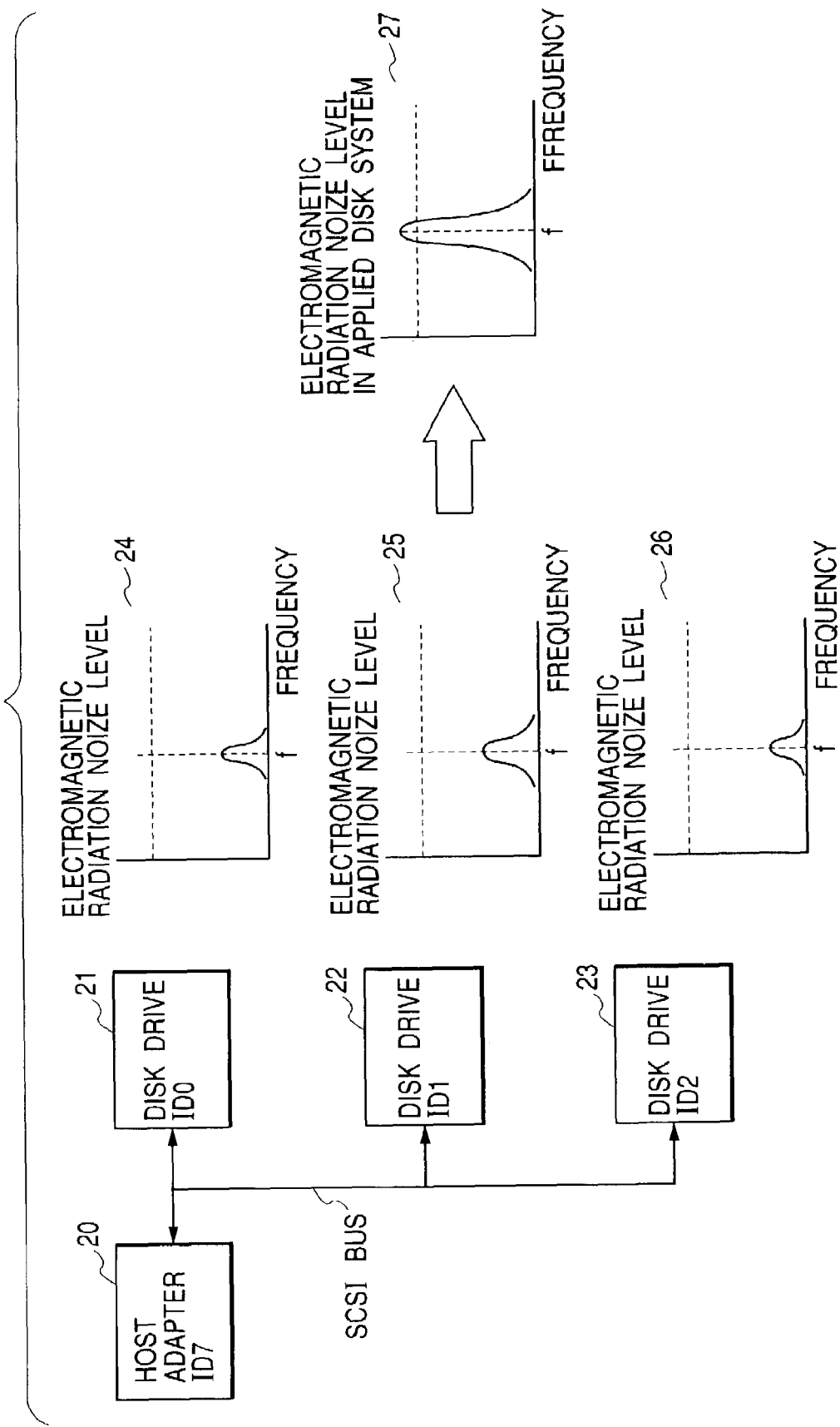

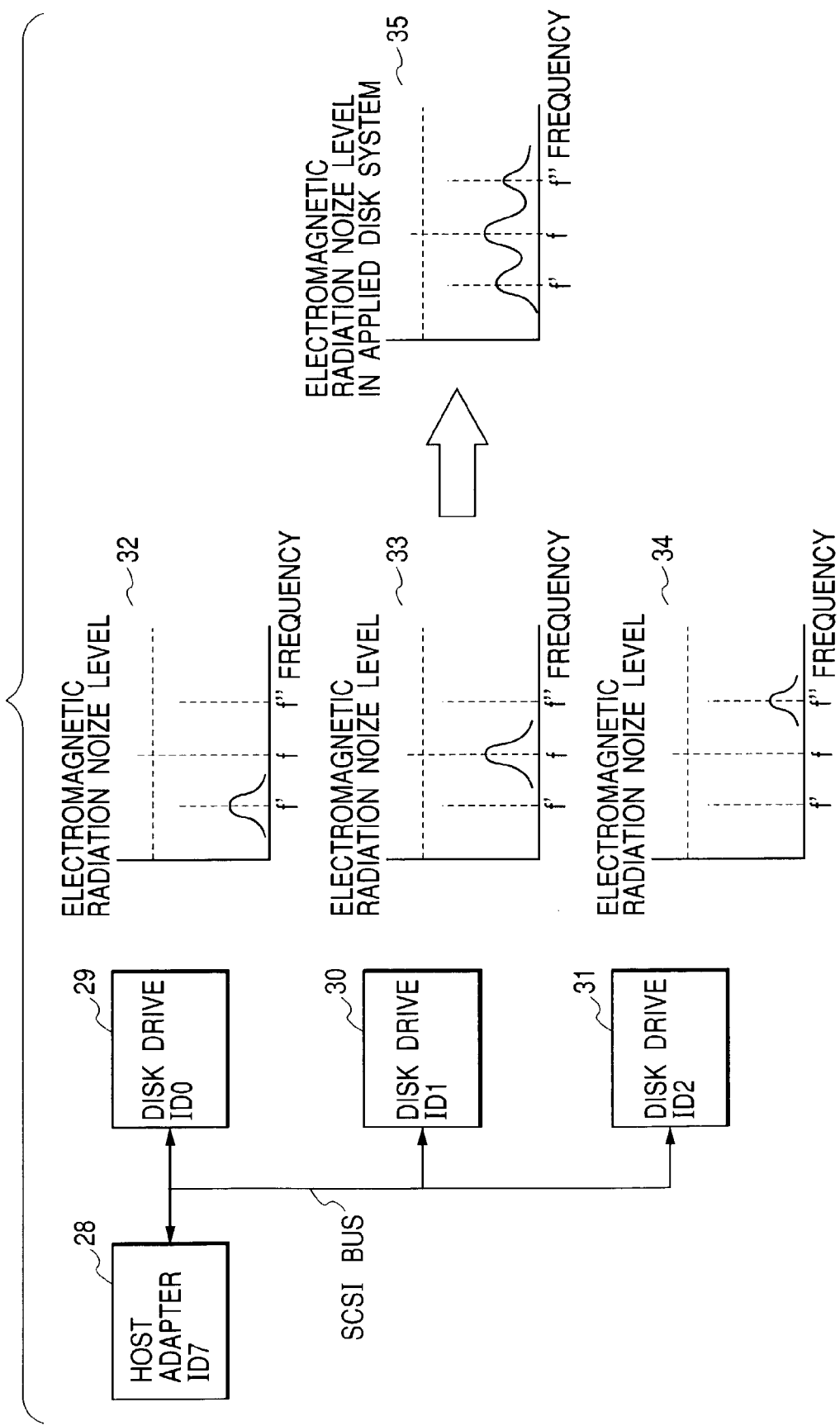

ADJUSTING CLOCK FREQUENCY IN A DISK DRIVE AND A DISK SYSTEM USING THE SAME

BACKGROUND OF THE INVENTION

1. Field of the Invention

The present invention relates to a disk system having a plurality of disk drives and, more particularly, to a disk system provided with the capability of adjusting the clock frequency of the clock signal generator contained in each disk drive so as to suppress the electromagnetic noise level radiated from the total disk system.

2. Description of the Prior Art

Electromagnetic noise is generated and radiated from small-scale computers, personal computers, servers, RAID devices and other data storage systems. The radiated electromagnetic noise (EMI) (hereinafter denoted as radiation noise) from such an electronic apparatus is required not to exceed a certain level (for example that specified by the FCC). To suppress radiation noise, efforts have been made with a cut-and-try approach, for example, by identifying the source of radiation noise and removing high frequency components from the waveform of the source signal or changing the arrangement of grounds (ground planes) so as to secure the earth potential.

In Japanese Patent Laid-open No.1994-131073, a prior art method is disclosed. This method concerns a plurality of option boards mounted on a computer system. Each option board is provided with a VCO to shift the clock frequency thereon so that each option board can have a different clock frequency. In this disclosure, however, no references are made to problems characteristic of disk systems and its application to disk systems is not suggested.

In a recent magnetic disk system consisting of a plurality of magnetic disk drives, it is usual that each magnetic disk drive has similar electronic characteristics and therefore generates radiation noise of almost the same frequency. Accordingly, the inventors of the present invention have found that this overlapping results in a considerably high radiation noise level. Note that in many cases, the radiation noise from a magnetic disk drive originates in its operation clock driving the internal electronic circuit and has harmonic frequencies of the clock's fundamental frequency. Also note that disk systems using optical disk media may suffer this problem, too, not peculiar to magnetic disk systems.

Referring to FIG. 3, the following will describe this problem in a magnetic disk system.

Magnetic disk drives 21, 22 and 23 operate from their clocks having the same frequency. Since radiation noise patterns 24, 25 and 26 emitted from the respective disk drives have the same frequency characteristic, they are added up to a high-resolution noise level 27 from the whole magnetic disk system. Enhancing the electromagnetic shielding of the whole system and reducing the radiation noise emitted from each magnetic disk drive have already reached the limits.

SUMMARY OF THE INVENTION

According to one aspect of the present invention, there is provided a multi-drive disk system characterized in that: each disk drive is provided with the capability of identifying its own identifier information and setting an operation frequency; the clock signal generator in each disk drive sets its clock frequency independently; and a different clock frequency is set in each disk drive.

Alternatively, the above system may be modified in such a manner that one of two memory transfer clock frequencies, for example, 125 MHz and 123 MHz, may be set in each disk drive depending on whether the SCSI logical device number is odd or even.

With this configuration, the radiation noise from each disk drive has a different frequency distribution and is not concenratedly added up. Therefore, the total radiation noise from the whole disk system can be reduced so as not to exceed a certain level over a frequency band of concern.

BRIEF DESCRIPTION OF THE DRAWINGS

FIG. 3 schematically shows how the radiation noise from each conventional magnetic disk drive connected to the SCSI bus is added up to an increased level if the radiation noise from each magnetic disk drive has the same frequency band; and FIG. 4 schematically shows the radiation noise emitted from a magnetic disk system comprising magnetic disk drives according to an embodiment of the present invention.

DESCRIPTION OF THE PREFERRED EMBODIMENTS

Figure 1:
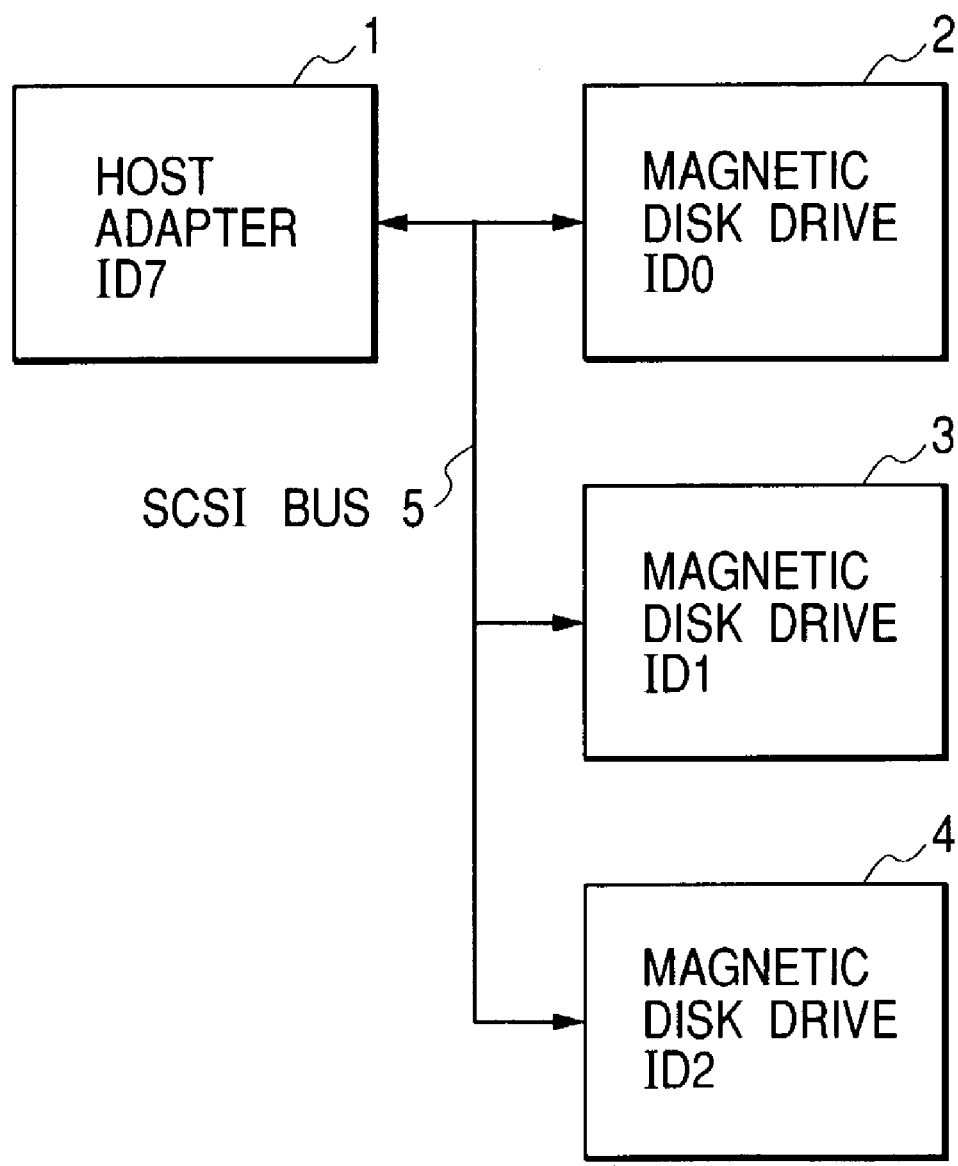
FIG. 1 schematically shows the configuration of a magnetic disk system, to which the present invention is applicable, comprising a host adapter and a plurality of magnetic disk drives, each of which is connected to a SCSI bus.

With reference to FIG. 1, a magnetic disk system according to an embodiment of the present invention will be described below. This magnetic disk system comprises a plurality of magnetic disk drives connected via a SCSI bus.

A host adapter 1 and magnetic disk drives 2, 3 and 4, which constitute a magnetic disk system, are connected by way of a SCSI bus 5.

They have unique SCSI IDs respectively so that they can be identified on the SCSI bus 5. In this figure, the host adapter 1 has ID7 while the magnetic disk drives 2, 3 and 4 have ID0, ID1 and ID2, respectively. Operations on the SCSI bus 5 are not detailed here since they are standardized by the ANSI. Note that the host adapter 1 has a control circuit (not shown in the figure). To control the magnetic disk drives 2, 3 and 4, the control circuit must be connected electrically to them via some information exchange path.

Figure 2:
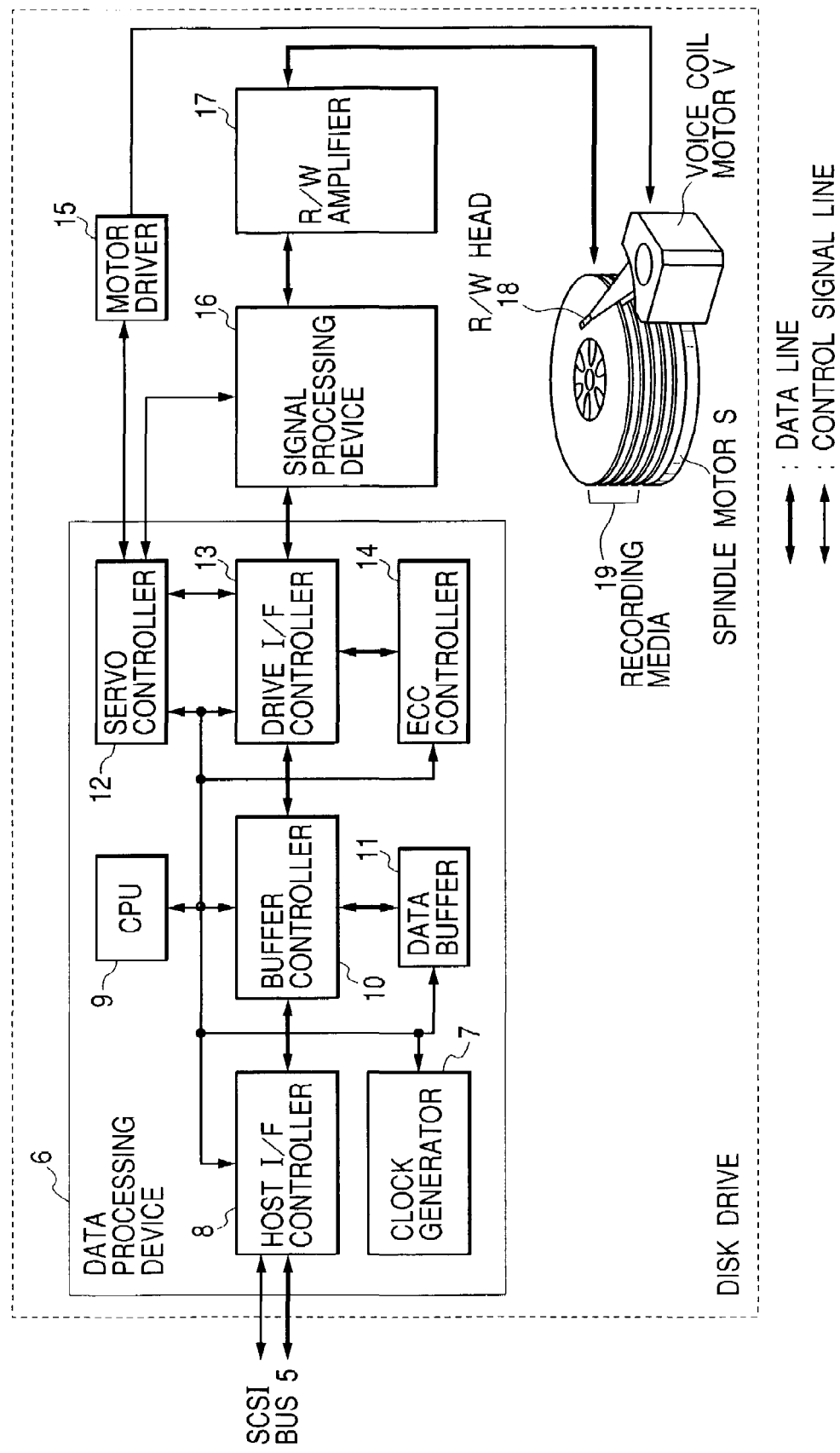
FIG. 2 is a block diagram which schematically shows the internal configuration of the magnetic disk drive.

FIG. 2 is an example of the configuration of a magnetic disk drive connected to the SCSI bus 5.

A host I/F controller 8 exchanges a command, status or data with the SCSI bus 5. A CPU 9 is responsible for general control of the magnetic disk drive including a host I/F controller 8, a buffer controller 10, a data buffer 11, a servo controller 12, a drive I/F controller 13 and an ECC controller 14.

The buffer controller 10 and the data buffer 11 are connected to the host I/F controller 8 and drive I/F controller 13 so that data are stored in or read from the data buffer 11. A clock generator 7 uses a frequency multiplier, PLL circuit, etc. to generate an operation clock from the base clock of a quartz oscillator, and supplies the clock to each block. Basically, each block is run by the clock supplied from the clock generator 7.

The drive I/F controller 13 exchanges data with a signal processing device 16. The servo controller 12 controls a motor driver 15 and the signal processing device 16. The motor driver 15 controls a spindle motor S to rotate magnetic recording media 19. In addition, the motor driver 15 supplies a certain level of power to a voice coil motor V in order to control a R/W head 18 cooperatively with a R/W amplifier 17 which exchanges control signals with the signal processing device 16, thus, recording/reproducing information to/from the recording media 19.

In the magnetic disk drive, the voice coil motor may also be replaced by another kind of head actuating mechanism such as a linear actuator.

In this embodiment, the clock frequency generated by the clock generator 7 is set on an each magnetic disk drive basis according to the aforementioned SCSI ID. Practically, the CPU 9 recognizes the SCSI ID and sends a frequency-setting signal to the clock generator 7 according to the recognized SCSI ID.

Frequency setting may also be done independently of the CPU 9. For example, if each magnetic disk drive is configured in such a manner that its SCSI ID is semi-permanently set by a physical switch, jumper or the like, it is possible for the clock generator 7 to recognize the physical setting as its identifier information (logical device number) when frequency setting is done on an each magnetic disk drive basis.

Further, the disk system may also be designed in such a manner that the control circuit of the host adapter 1 recognizes the SCSI ID of each magnetic disk drive and instructs the CPU 9 or clock generator 7 of each magnetic disk drive to set a frequency predetermined for the recognized SCSI ID.

When a 16-bit wide SCSI is used, 16 different SCSI IDs, 0 to 15, are available. Each SCSI ID may be associated with a different clock frequency. In this case, the 16 SCSI IDs are associated with 16 clock frequencies, respectively. Instead, it is also possible to associate two different clock frequencies in such a manner that the odd SCSI IDs are associated with one clock frequency while the even SCSI IDs are associated with the other clock frequency. For example, if the allowable clock frequency range is from 100 MHz to 130 MHz, 123 MHz and 125 MHz may be associated respectively with the odd and even SCSI IDs in this case.

FIG. 4 schematically shows how the aforementioned embodiment is effective in reducing radiation noise. Since each of the magnetic disk drives 29, 30 and 31 operates from an operation clock having a different frequency, the levels 32, 33 and 34 of radiation noise from the respective magnetic disk drives are distributed over different frequency bands. Therefore, the radiation noise from the whole magnetic disk system does not include a high level as shown in reference numeral 35.

Preferably, the clock frequency of each magnetic disk drive should be set in such a manner that either |f−f'| or |f−f"| along the horizontal axis in FIG. 4 is larger than Δf, the frequency resolution in the radiation noise level measurement.

As mentioned so far, the electromagnetic noise radiated from a magnetic disk system can be suppressed so as not to exceed a certain level over a specific frequency band by allowing the operation clock frequency of each disk drive to be set independently so that the radiation noise from each disk drive has a different frequency distribution.

While the present invention has been described with reference to one embodiment, a magnetic disk system comprising a plurality of magnetic disk drives, the invention may also be applied to an optical disk system comprising a plurality of optical disk drives, not limited to such magnetic disk systems.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A disk drive comprising:
   a spindle motor for drivingly rotating disk media;
   a head for recording or reproducing information to or from said disk media;
   a head actuating mechanism for moving said head to a desired place on said disk media;
   means for processing a signal to be supplied to said head and a signal reproduced from said head;
   a clock generator; and
   a CPU;
   wherein said clock generator is provided with the capability of recognizing identifier information regarding said disk drive and setting a clock frequency based on the recognition.

2. The disk drive according to claim 1 wherein said clock generator recognizes identifier information regarding said disk drive through physical means provided on said disk drive.

3. The disk drive according to claim 1 wherein the SCSI logical device number of said disk drive is used as said identifier information.

4. A disk drive comprising:
   a spindle motor for drivingly rotating disk media;
   a head for recording or reproducing information to or from said disk media;
   a head actuating mechanism for moving said head to a desired place on said disk media;
   means for processing a signal to be supplied to said head and a signal reproduced from said head;
   a clock generator; and
   a CPU;
   wherein said CPU recognizes identifier information regarding said disk drive and setting a clock frequency based on the recognition.

5. The disk drive according to claim 4 wherein said CPU recognizes identifier information regarding said disk drive through physical means provided on said disk drive.

6. The disk drive according to claim 4 wherein the SCSI logical device number of said disk drive is used as said identifier information.

7. A disk system comprising:
   at least two disk drives each of which has a clock generator; and
   a control circuit which is connected to said disk drives for control of said disk drives;
   wherein said control circuit is provided with the capability of obtaining identifier information regarding said disk drives and setting the operation clock frequency of each disk drive.

8. The disk system according to claim 7 wherein an operation clock frequency of one of said disk drives is set differently from that of the other disk drive.

9. The disk system according to claim 8 wherein SCSI logical device numbers are used as said identifier information.

10. The disk system according to claim 9 wherein two clock frequencies are associated respectively with the even and odd logical device numbers.

11. A magnetic disk system comprising:
    a host adapter;
    a plurality of magnetic disk drives; and a SCSI bus for connecting said host adaptor to said plurality of magnetic drives;

wherein said magnetic disk drives each comprise a magnetic disk; a head for recording and reproducing information to and from said magnetic disk; means for processing a signal to be supplied to said head and a signal reproduced from said head; a clock generator; and a CPU, and said host adapter recognizes the SCSI ID of each magnetic disk drive and instructs said clock generator of each magnetic disk drive to set a clock frequency associated with the SCSI ID.

12. The magnetic disk system according to claim 11 wherein said clock generator sets one of two clock frequencies depending on whether the SCSI ID is odd or even.

13. The magnetic disk system according to claim 11 wherein said clock generator sets a clock frequency in such a manner that a different clock frequency is set for each SCSI ID.

14. A magnetic disk system comprising:
a host adapter; and
a plurality of magnetic disk drives; and
a SCSI bus for connecting said host adaptor to said plurality of magnetic disk drives;

wherein said magnetic disk drives each comprise a magnetic disk; a head for recording and reproducing information to and from said magnetic disk; means for processing a signal to be supplied to said head and a signal reproduced from said head; a clock generator; and a CPU, and said CPU of each magnetic disk drive recognizes the SCSI ID of said magnetic disk drive and sets a clock frequency associated with the SCSI ID on said clock generator of said magnetic disk drive.

15. The magnetic disk system according to claim 14 wherein said clock generator sets one of two clock frequencies depending on whether the SCSI ID is odd or even.

16. The magnetic disk system according to claim 14 wherein said clock generator sets a clock frequency in such a manner that a different clock frequency is set for each SCSI ID.

17. The magnetic disk system according to claim 14 wherein said CPU of each magnetic disk drive sets a clock frequency associated with the recognized SCSI ID upon receipt of instruction from said host adapter.

18. A magnetic disk system comprising:
a host adapter;
a plurality of magnetic disk drives; and
a SCSI bus for connecting said host adaptor to said plurality of magnetic disk drives wherein said magnetic disk drives each comprise a magnetic disk; a head for recording reproducing information to and from said magnetic disk; means for processing a signal to be supplied to said head and a signal reproduced from said head; a clock generator; and a CPU, and said clock generator of each magnetic disk drive recognizes the SCSI ID of said magnetic disk drive and sets a clock frequency associated with the SCSI ID.

19. The magnetic disk system according to claim 18 wherein said clock generator sets one of two clock frequencies depending on whether the SCSI ID is odd or even.

20. The magnetic disk system according to claim 19 wherein said clock generator sets a clock frequency in such a manner that a different clock frequency is set for each SCSI ID.

* * * * *